(12) United States Patent
Milburn et al.

(10) Patent No.: US 9,246,999 B2
(45) Date of Patent: Jan. 26, 2016

(54) DIRECTED WI-FI NETWORK IN A VENUE INTEGRATING COMMUNICATIONS OF A CENTRAL CONCERT CONTROLLER WITH PORTABLE INTERACTIVE DEVICES

(71) Applicants: Andrew Milburn, Los Angeles, CA (US); Thomas Hajdu, Santa Barbara, CA (US)

(72) Inventors: Andrew Milburn, Los Angeles, CA (US); Thomas Hajdu, Santa Barbara, CA (US)

(*) Notice: Subject to any disclaimer, the term of this patent is extended or adjusted under 35 U.S.C. 154(b) by 121 days.

(21) Appl. No.: 13/895,300

(22) Filed: May 15, 2013

(65) Prior Publication Data
US 2013/0308621 A1 Nov. 21, 2013

Related U.S. Application Data

(60) Provisional application No. 61/648,593, filed on May 18, 2012, provisional application No. 61/670,754, filed on Jul. 12, 2012, provisional application No. 61/705,051, filed on Sep. 24, 2012, provisional application No. 61/771,629, filed on Mar. 1, 2013, provisional application No. 61/771,646, filed on Mar. 1, 2013, provisional application No. 61/771,690, filed on Mar. 1, 2013, provisional application No. 61/771,704, filed on Mar. 1, 2013.

(51) Int. Cl.
| | |
|---|---|
| *H04L 29/06* | (2006.01) |
| *H04W 4/06* | (2009.01) |
| *H04L 29/08* | (2006.01) |
| *H04N 5/04* | (2006.01) |
| *G11B 27/034* | (2006.01) |
| *G11B 27/10* | (2006.01) |
| *H04W 4/20* | (2009.01) |
| *G10L 21/10* | (2013.01) |
| *H04W 4/02* | (2009.01) |
| *G10L 25/03* | (2013.01) |

(52) U.S. Cl.
CPC ............ *H04L 67/1095* (2013.01); *G10L 21/10* (2013.01); *G11B 27/034* (2013.01); *G11B 27/105* (2013.01); *H04L 65/403* (2013.01); *H04L 65/4076* (2013.01); *H04L 67/10* (2013.01); *H04N 5/04* (2013.01); *H04W 4/206* (2013.01); *G10L 25/03* (2013.01); *H04L 65/40* (2013.01); *H04W 4/02* (2013.01); *H04W 4/06* (2013.01)

(58) Field of Classification Search
CPC .... G11B 27/034; G11B 27/105; G10L 25/03; H04L 65/403; H04L 65/4076; H04L 67/10; H04L 67/1095; H04N 5/04; H04W 4/02; H04W 4/06; H04W 4/206
USPC .......................................... 370/310, 328, 338
See application file for complete search history.

(56) References Cited

U.S. PATENT DOCUMENTS

| 2004/0088212 A1* | 5/2004 | Hill ................................. 705/10 |
| 2008/0227500 A1* | 9/2008 | Heyworth et al. ............ 455/566 |

(Continued)

*Primary Examiner* — Chi H Pham
*Assistant Examiner* — Robert Lopata
(74) *Attorney, Agent, or Firm* — Continuum Law; Robert P. Cogan

(57) ABSTRACT

Communications between a central concert controller and portable interactive devices of audience members in a venue are integrated through a Wi-Fi network providing coverage of the venue. A multi-megabit traffic exchange without loss of data is achieved. Both omnidirectional and highly directional radios utilize a single frequency in order to provide a signal to areas that are not in a line of sight of a single Wi-Fi source. Each directional radio includes a backhaul transceiver. Users are sent images such as streaming videos by a video jockey, and may upload content to the central system. A server within the system controls interactions of user devices. Each user device may be assigned a unique ID number.

10 Claims, 7 Drawing Sheets

(56) References Cited

U.S. PATENT DOCUMENTS

| | | |
|---|---|---|
| 2009/0119590 A1* | 5/2009 | Kondziela et al. ............ 715/716 |
| 2011/0178854 A1* | 7/2011 | Sofer et al. ................... 705/14.4 |
| 2011/0231878 A1* | 9/2011 | Hunter et al. .................... 725/48 |
| 2011/0288939 A1* | 11/2011 | Elvekrog et al. ........... 705/14.67 |
| 2012/0059906 A1* | 3/2012 | Ciancio-Bunch et al. .... 709/217 |
| 2012/0136959 A1* | 5/2012 | Kadam et al. ................. 709/217 |
| 2012/0158775 A1* | 6/2012 | Choi et al. .................... 707/769 |
| 2013/0097101 A1* | 4/2013 | Ortiz ................................ 706/11 |
| 2013/0113993 A1* | 5/2013 | Dagit, III ...................... 348/552 |
| 2013/0179513 A1* | 7/2013 | Furukawa ..................... 709/204 |
| 2013/0198280 A1* | 8/2013 | Liu et al. ....................... 709/204 |
| 2014/0013230 A1* | 1/2014 | Malone ......................... 715/723 |
| 2014/0040765 A1* | 2/2014 | Fung et al. .................... 715/748 |
| 2014/0304335 A1* | 10/2014 | Fung et al. .................... 709/204 |
| 2015/0046370 A1* | 2/2015 | Libin et al. .................... 705/345 |

* cited by examiner

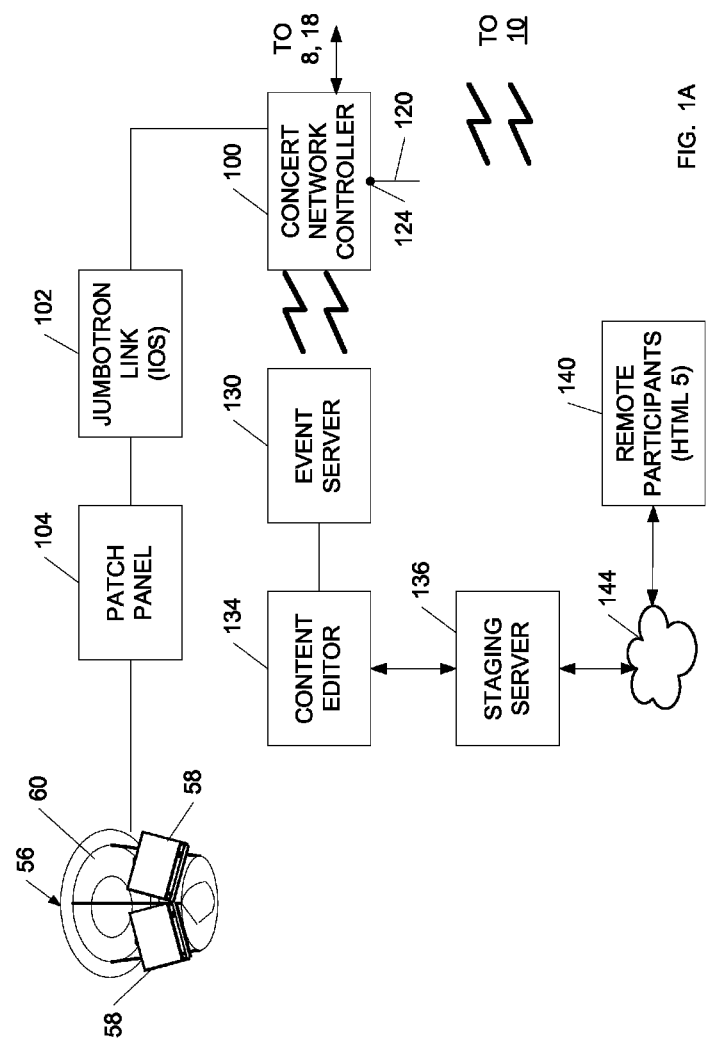

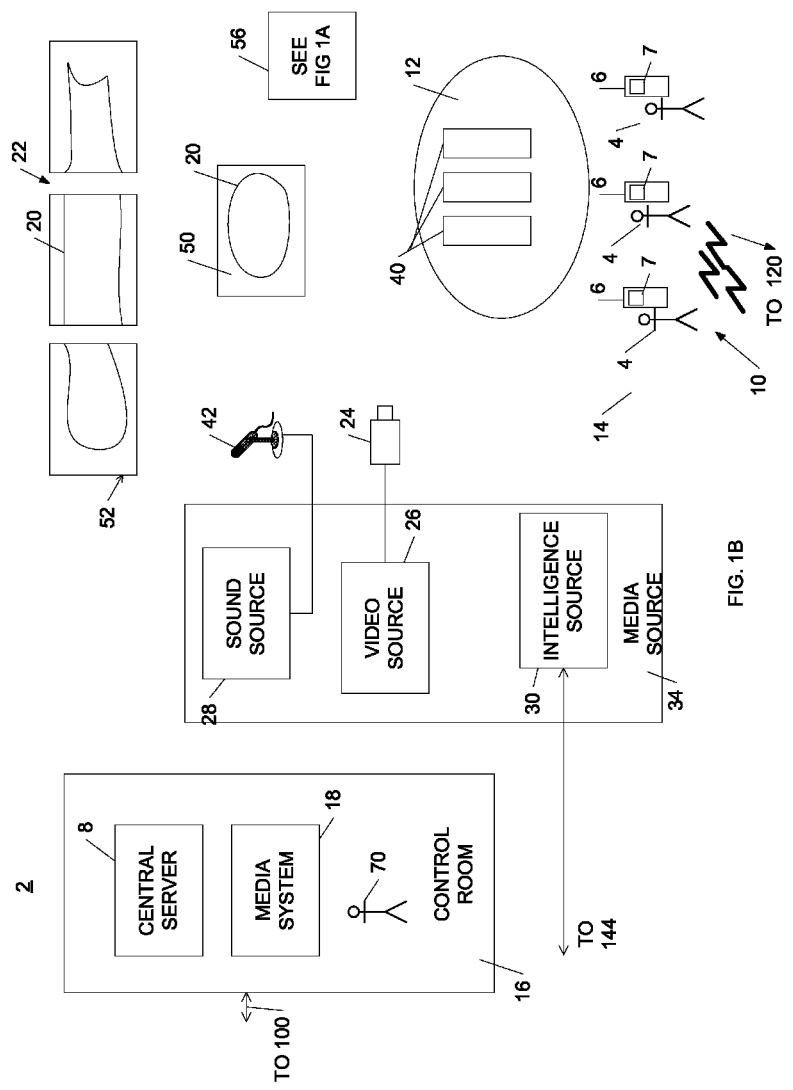

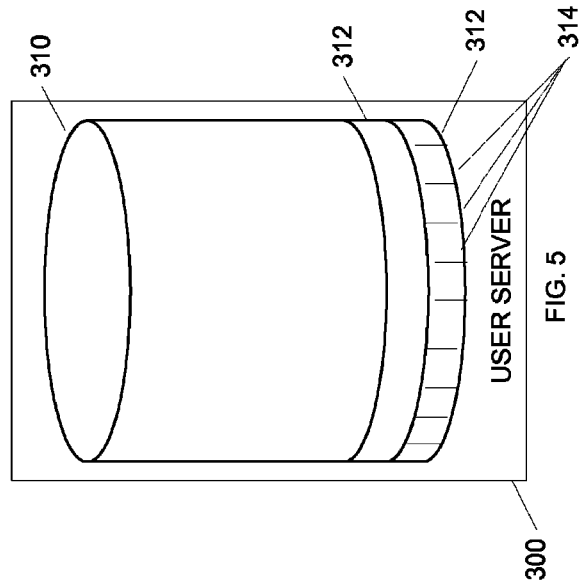

DIRECTED WI-FI NETWORK IN A VENUE INTEGRATING COMMUNICATIONS OF A CENTRAL CONCERT CONTROLLER WITH PORTABLE INTERACTIVE DEVICES

CROSS REFERENCE TO RELATED APPLICATIONS

This patent application claims priority of Provisional Patent Application 61/648,593 filed May 18, 2012, Provisional Patent Application 61/670,754 filed Jul. 12, 2012, Provisional Patent Application 61/705,051 filed Sep. 24, 2012, Provisional Patent Application 61/771,629 filed Mar. 1, 2013, Provisional Patent Application 61/771,646 filed Mar. 1, 2013, Provisional Patent Application 61/771,690 filed Mar. 1, 2013, and Provisional Patent Application 61/771,704 filed Mar. 1, 2013, the disclosures of which are each incorporated by reference herein in its entirety.

BACKGROUND OF THE INVENTION

1. Field of the Invention

The present subject matter relates to the integration of communications between a central concert controller and portable interactive devices of audience members in a venue through a Wi-Fi network.

2. Background

A recently developed enhancement of the concert experience includes providing a performance and interacting with client devices of individuals in an audience.

A shortcoming in the prior art is that while mobile coverage has been provided, it has not been designed to reach substantially all audience members or to provide coverage within the nominal bandwidth limitations of entertainment venues. Cell phones may be used to couple users to a live event. However, in many venues cell phone communications will be shielded. There will be venues in which cell phone communication will be shielded.

A Wi-Fi link is an alternative way to connect to an audience. However, municipal and local Wi-Fi networks are not designed to reach thousands of visitors at a time. Stadium venues typically include seating sections comprising concrete tiers. These tiers effectively block Wi-Fi transmissions. United States Published Patent Application No. 20110075612 discloses a system in which content is sent to a plurality of receiving access terminals (portable devices) within a venue boundary, i.e. venue cast. Content generated at an access terminal, is transmitted to a venue cast server. A venue-specific network could be a wide area network (WAN) or a Wi-Fi hotspot deployment. The system provides "unscheduled ad hoc deliveries" of content via the venue transmission system to provide venue visitors with venue related information. This system provides for one-way transmission of content. There is no mechanism for creating interaction between users and the venue cast server. There is no suggestion of creating a shared experience among users.

United States Published Patent Application No. 20110212683 illustrates a network operable within sports and entertainment venues to provide wireless data communications system nodes distributed throughout a sports and entertainment venue establishing a wireless communication network supporting communications with hand held devices. Each node must be a stand-alone node with its own server that is continuously synchronized with a central, synchronizing server. This increases expense of the system and complexity of communications.

U.S. Pat. No. 6,731,940 discloses methods of using wireless geolocation to customize content and delivery of information to wireless communication devices which send signals to a central control system. The method uses an RF receiving site including antenna array and a mobile device operated by a user. In a p-dimensional array, a vector is derived from RF signals sampled from p antennas of array to derive a location of the mobile device. Location-specific information is transmitted to a user, e.g., targeted advertisements or special services to travelers and shoppers. Interaction is not provided.

It has also not been possible to communicate specific messages to individual devices or groups of devices which are capable of interaction.

SUMMARY

Briefly stated, in accordance with the present subject matter, communications between a central concert controller and portable interactive devices of audience members in a venue are integrated through a Wi-Fi network providing coverage of the venue. The system allows for Wi-Fi coverage with a multi-megabit traffic exchange and without loss of data.

A Wi-Fi network providing substantially complete coverage of a venue is provided to have a node which communicates with a concert network controller. A venue is surveyed to determine which sections are not reachable by a single line-of-sight Wi-Fi source. A signal pattern is designed to ensure complete coverage of the venue sections. Both omnidirectional and highly directional transceivers utilize a single frequency in order to provide a signal to areas that are not reachable with the single Wi-Fi source. Each directional transceiver may include a backhaul transceiver.

A Wi-Fi hot spot assures the ability to communicate with portable devices of users in an audience. Use of the Wi-Fi system also allows greater bandwidth since bandwidth of a cell phone system is not a constraint. Users are sent images which may be streaming videos or groups of images from a central event system which may be operated by a video jockey (VJ). Users may upload content to the central system, and the VJ or an automated content recognition system may review uploaded content and select content to send to devices in the audience.

A server within the system controls interactions of user devices. Each user device may be assigned a unique ID number. Information about specific devices may be stored on an event server. Transmissions may be made to individual devices or groups of devices. The server may also enable and control transmissions between selected users. In one form, the central server assigns unique identification numbers to portable interactive devices to facilitate control of communications. Via the Wi-Fi system, the central server can select individual devices or groups of portable interactive devices with which to interact and may command groups of portable interactive devices to communicate with each other. In this manner, audience participation in games and other activities causing to draw participants into the shared experience can be achieved.

BRIEF DESCRIPTION OF THE DRAWINGS

The present subject matter may be further understood by reference to the following description taken in connection with the following drawings:

FIG. 1, consisting of FIGS. 1A and 1B, is an illustration, partially in block diagram form of the method and apparatus of the present subject matter operating in a venue;

FIG. 5 is a block diagram illustrating interaction of user portable devices, and a server;

FIG. 6 illustrates a table in which user device data is mapped into categories;

DETAILED DESCRIPTION

A newly developing form of concert entertainment is the enhanced concert experience. Initially, a concert experience enhancement involved either a light show or video background accompanying a concert. In the context of the present subject matter, enhanced concert experience can include interaction of a central media system with client devices, generally portable interactive devices of audience members. Examples of portable interactive devices are smartphones and tablets. A central media system may comprise a source of live or recorded media. Content from the media system may be delivered to client devices via a central server or a concert network controller. For purposes of the present illustration, a difference between a concert network controller and a central server is not significant. In either event, content from the media system is provided in a form which can interact with client devices.

The present subject matter is discussed in the context of audience members utilizing smartphones at a live concert event. This promises to be the predominant use of the present subject matter. However, the specification of a specific physical environment or a specific type of event is used as an aid in description. It does not limit the application of the principles discussed to only the presently illustrated context.

In one form of interaction, users are sent images which may be streaming videos or groups of images from a central event system which may be operated by a video jockey (VJ). Additionally users may upload content to the central system, and the VJ or an automated content recognition system may review uploaded content and select content to send to devices in the audience. Additionally or alternatively, content may be delivered to a video display.

A system and method are provided in which communications are integrated on a concert network controller and portable interactive devices. A Wi-Fi network interacts with a central server to communicate with substantially all members of an audience to provide an immersive experience. In one form, the central server assigns unique identification numbers to portable interactive devices to facilitate control of communications. Via the Wi-Fi system, the central server can select individual devices or groups of portable interactive devices with which to interact and may command groups of portable interactive devices to communicate with each other. In this manner, audience participation in games and other activities draws participants into the shared experience.

Figure 2:
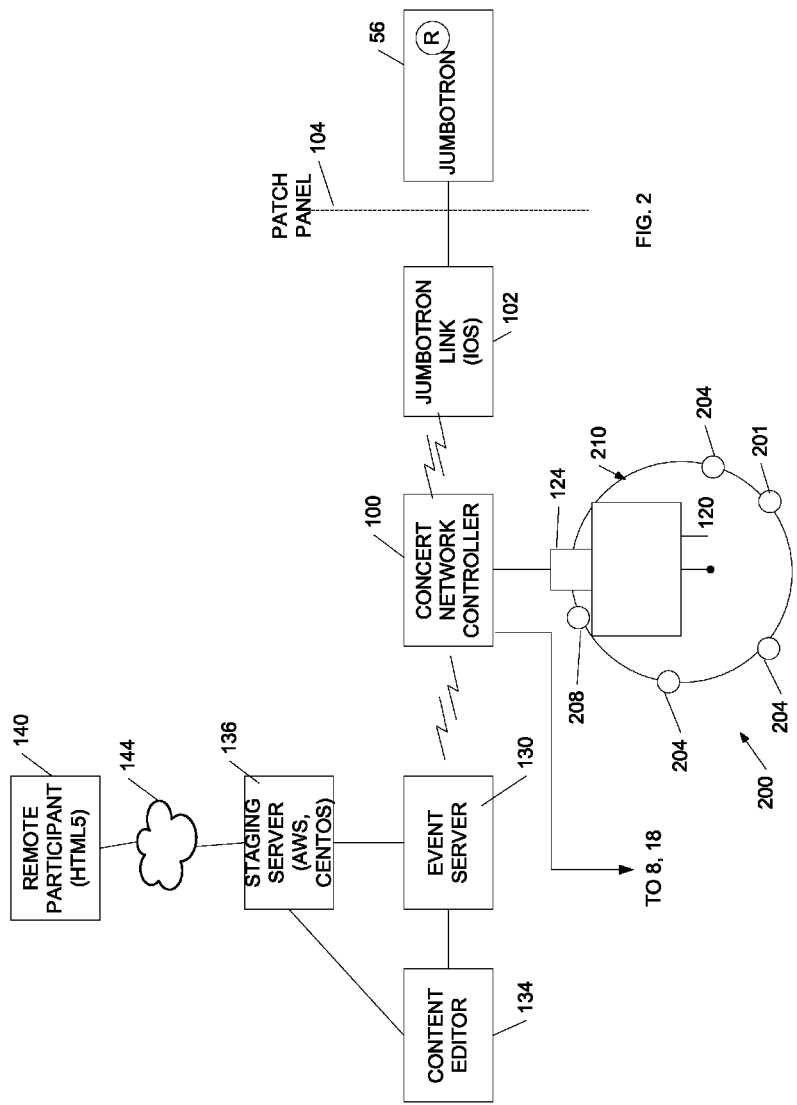
FIG. 2 is a high level block diagram of communication paths in the system illustrated in FIG. 1.

FIG. 1, consisting of FIGS. 1A and 1B, is an illustration of a venue 10 comprising a system 2 in accordance with the present subject matter. FIG. 2 is a high level block diagram of communication paths in the system illustrated in FIG. 1. FIGS. 1 and 2 are discussed at the same time. The system 2 may be used in conjunction with a live event, for example a concert. Two-way interactivity is provided between a central server 8 and individual audience members 4 who may each have a portable device 6. The portable device 6 may be a smartphone, tablet, or other device. The present subject matter addresses providing reliable, high-capacity interaction in a highly efficient manner. The present subject matter provides for both reaching substantially an entire audience physically and for efficiently managing communications between portable devices 6.

An app 7 is installed on the user device 6 in order to interface the user device 6 to the system 2 and enable interactions as described below. Apps may be created in many different ways. One set of tools is found in the Wireless Application Protocol (WAP).

The venue 10 may include a stage 12, audience area 14, a control room 16, and a media system 18 which may be located in the control room 16. The media system 18 receives audio, video, and intelligence from sources and may be operated to perform control room functions such as mixing, selecting, and processing. A video program 20 is shown on a display 22.

The media system 18 is used to couple outputs from a video source 26, a sound source 28, and other intelligence source 30. The video source 26 may comprise one or more television cameras 24. In the present illustration, a media source 34 includes the video source 26, sound source 28, and other intelligence source 30. The sound source 28 comprises audio output from a live performance provided by a performer or performers 40 coupled by transducers 42, such as microphones. Alternatively, one or more of the video source 26, the sound source 28, and other intelligence source 30 may comprise sources of streaming content, prerecorded content, stored data, or currently processed content from any source. These sources may be local, remote, or both.

In one preferred form the display 22 is a screen 50 that comprises a backdrop for the stage 12. The display 22 could comprise an array 52 of screens over which the video program 20 is distributed. In another form, often used in arenas, the display 22 could comprise a display unit 56 which includes a plurality of monitors 58 on one support 60, with each monitor 58 facing in a different direction. Examples of the display unit 56 are available under the trademark Jumbotron®.

The media system 18 is operated by a VJ 70. The VJ 70 may comprise one or more personnel or a programmed computer. It is not essential that the control room 18 be located at the venue 10. The media system 18 provides content to a concert network controller 100. The concert network controller 100 may both receive and transmit information. The concert network controller 100 provides an input to a display link 102, which is coupled by a patch panel 104 to the display unit 56.

The concert network controller 100 is coupled to a Wi-Fi hotspot 120 which can transmit signals to and receive signals from portable devices 6. The Wi-Fi hotspot 120 may comprise a node 124 of a Wi-Fi network 200.

The concert network controller 100 is preferably wirelessly connected to an event server 130, which can provide communications between remote participants 140 and the concert network controller 100. The event server 130 is coupled to a content editor 134, which interacts with a staging server 136. The staging server 136 may be coupled to the remote participants 140 by a network, for example, the Internet 144.

The system is interactive between the concert controller 100 and one or both of the remote participants 140 and local participants 4. The concert controller 100 and one or both of the remote participants 140 and local participants 4 may be a source when another is a target. The target and source system roles can be assumed by each device at different times without requiring reconfiguration.

Communications will be provided between a target system and a source system. In the present description, "source system" is a device that wishes to send a message to a "target system." The target system is a device that is configured to receive sent messages through its operating system provided via a network. A device can operate as needed as the target system or the source system. Operating as a source system or target system for a particular messaging transaction does not preclude operating as the other system for a different messaging transaction at the same time.

As further described below, the source system can utilize any of many potential mechanisms to construct the outgoing data. Once constructed the source system places the outgoing data into a standard network handling layer of its operating software, and it is this operating software that handles the initial transmission of data.

Relay devices, such as the Wi-Fi hotspot 120 couple the concert controller 100 to other selected systems, such as portable devices 6. A Wi-Fi system must provide media to substantially all audience members 4 in order to provide a successful and immersive event experience regardless of venue construction. In the sort of venue that is generally encountered, it is impossible to reach all audience areas with a single Wi-Fi transmitter. Wireless infrastructure provided by mobile operators was not designed to handle the concentrations of users that are typically found at an entertainment event. Municipal or venue local Wi-Fi "hotspots" are not designed to handle 5000 or more visitors found in club style events. Such systems are also not designed for larger venues such as the Staples Center in Los Angeles with a capacity of over 18,000. Therefore, the present subject matter includes its own Wi-Fi infrastructure which can be permanently or temporarily installed in a venue.

Figure 3:
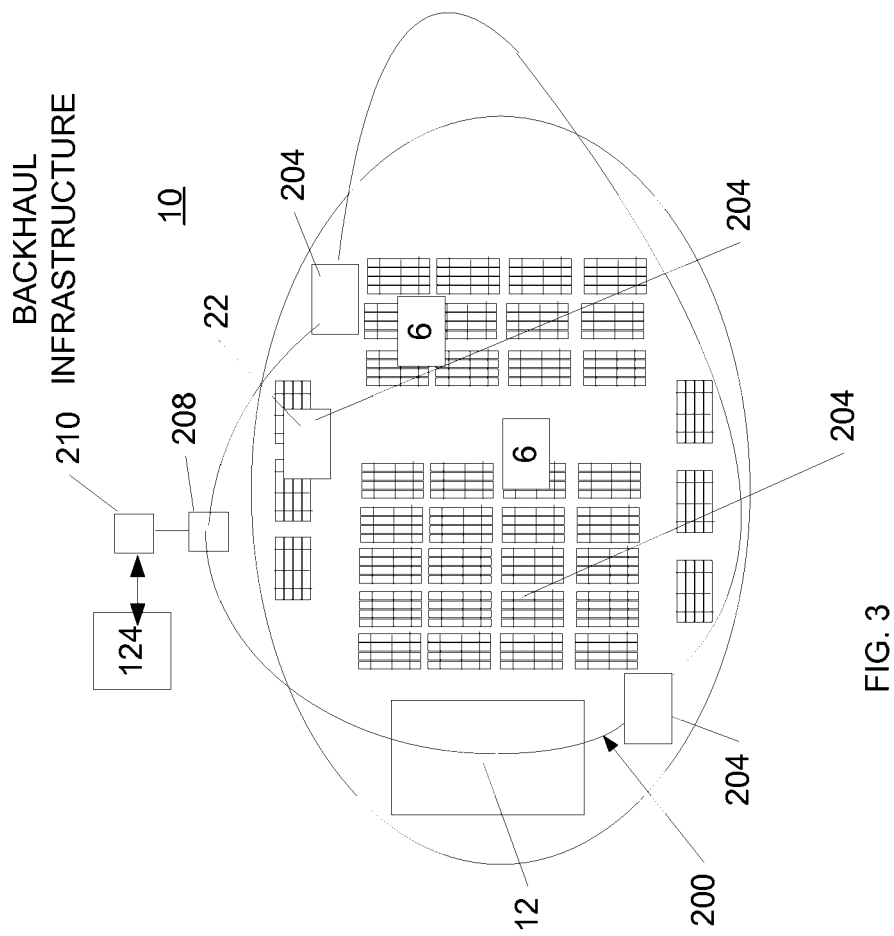
FIG. 3 is an illustration of Wi-Fi deployment in a venue.

FIG. 3 is an illustration of a Wi-Fi network 200 deployed in a venue 10. The Wi-Fi network 200 comprises a plurality of transceivers 204 each coupled to a central receiver 208. A backhaul infrastructure 210 couples the Wi-Fi network 200 to the Wi-Fi node 124. The Wi-Fi node 124 is coupled to the concert network controller 100. Both omnidirectional and highly directional radios utilize a single frequency in order to provide a signal to areas that are not in a line of sight of a single Wi-Fi source.

A high performance backhaul infrastructure 210 gets traffic onto the node 124 for processing. Wireless backhaul infrastructure couples data to or from an end user to a node in a major network such as the Internet or the proprietary network of a large business, academic institution, or government agency. The term can also refer to the transmission of network data over an alternative wireless route when the normal route is unavailable or overloaded. Backhaul is also used to get non-live audio and video material to distribution. The present network architecture utilizes the topology of the venue 10 to both bounce and isolate signals to ensure complete coverage by the Wi-Fi network 200 for participants of the event and to enable communication between all users 4 and the VJ 70.

The backhaul infrastructure 210 must be deployed such that access points distributed around a large area, such as a concert venue 10, have a line of sight connection or a high quality bounced connection to a backhaul receiver. A backhaul receiver, which may be included with each transceiver 204, itself can repeat the signal, wirelessly or by wire to a further concentrator and then on to the target system.

The optimum choice for wireless backhaul technology involves considerations such as network capacity, expected or required data speed, relative cost, electromagnetic interference, and the availability of radio frequency spectrum space. Custom mounts and batteries feed into a multistage network with wireless backhaul that enables the deployment of a usable Wi-Fi network into previously unavailable venues such as concerts and sporting events. Key areas of the functionality take advantage of the capabilities of dynamic transmission power, client device hand-off, channel, and directionality self-regulation.

Once constructed, the Wi-Fi network 200 provides a simple mechanism to initiate transmission of messages to and from a set of targets. A set of targets may comprise portable devices 6 in a particular area of the venue 10. A set of targets could alternatively comprise one type of device. The framework further provides simplified access to received messages. The Wi-Fi network 200 may perform grouping of preselected sets.

The present Wi-Fi network architecture uses two distinct types of wireless transmitter to provide blanket Wi-Fi coverage. For venues up to about 5000 participants with a large central open space such as a dance floor or a basketball court, high capacity transceivers with up to 360 degree wireless coverage have been provided in the prior art. Large central open spaces can be covered by these high capacity access points. Stand areas of large stadiums are typically built along concrete tiers that effectively block Wi-Fi transmissions.

The present system overcomes this obstacle by providing smaller, highly directional access points designed to cover discrete sections of seats. The network architecture utilizes compact single frequency transceivers along with a battery and backhaul transceiver in a self-contained and sealed box that can be fit under the seat or attached unobtrusively to the base of a handrail.

By employing two different modes of Wi-Fi coverage the network architecture effectively covers venues as small as 5 to 600 participants to large venues accommodating 20,000 or more audience members. Capacity can be scaled up to cover very large venues that may seat on the order of 100,000 audience members, e.g., the Los Angeles Coliseum.

Due to deployment venue topology, in order to provide full coverage, more transceivers 204 may be required than would simply be needed to meet bandwidth requirements.

Figure 4:
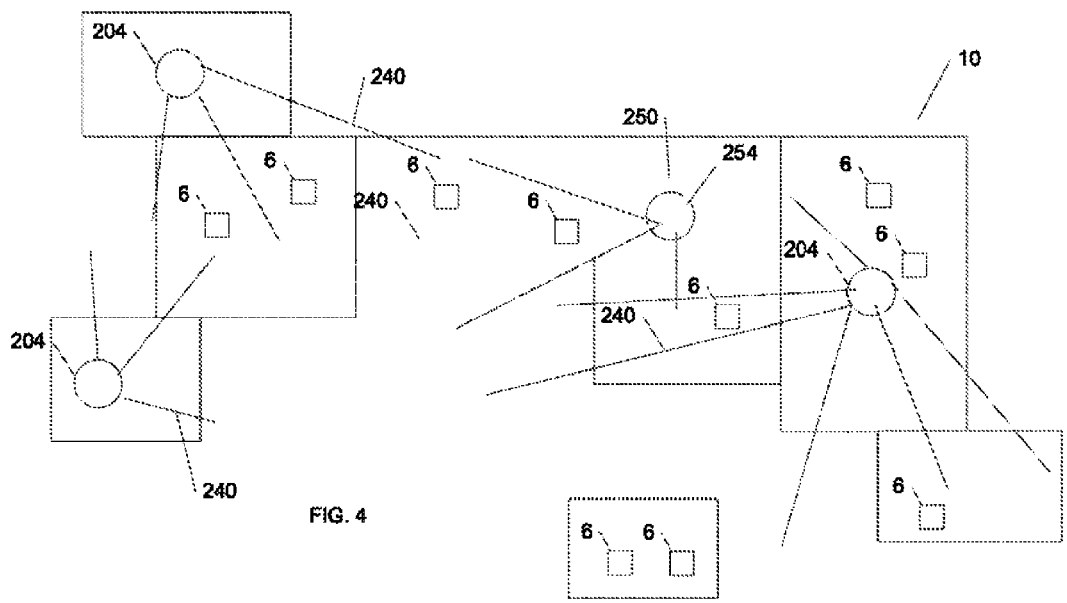
FIG. 4 is a plot showing Wi-Fi communication to cover a particular venue.

FIG. 4 is a plot showing a Wi-Fi survey in order to determine Wi-Fi communication to cover a particular venue 10. In order to determine the number of transceivers 204 required, and their placement, a survey is taken. Line-of-sight communications paths 240 are tested by a surveyor in order to determine line of sight access between locations in which interactive user devices 6 may be located. Test transceivers 250 may be deployed at selected locations 254 and efficacy of communication paths 240 may be tested by attempting communications between portable user devices 6 and a test transceiver 250.

FIG. 5 illustrates a user server 300. The user server 300 contains a device user database 310 identifying users in the audience. The user server 300 may be conveniently located in the concert network controller 100. Alternatively, the user server 300 could be located in the system control server 8.

The device user database 310 contains a plurality of memory locations 312. One memory location 312 may be associated with each portable user device 6 and respective user 4. Each memory location 312 may include a plurality of fields 314 including different types of information, in the nature of tags, for a user associated with each portable user device 6. One field 314 within a memory location 312 comprises an identity of the portable user device 6.

A number of ways may be used to assign this identifying information. For example, the user server 300 may assign a temporary identification number to each portable user device 6 that logs onto the system 2. One alternate form uses the app 7 for use on each user device 6. This app 7 is of the type which, when installed, is granted permission to access the serial number of each individual phone. This serial number may be stored as a unique identifier.

Additionally, demographic information can be entered in a memory location corresponding to a user 4. The app 7 can also have access to social networking data such as Facebook in order to gather demographic information on the user 4. In one form, the system permits the user 4 to access his or her social network account. The app 7 uses its permissions to "scrape" information from the respective portable device 6.

FIG. 6 illustrates a table 360 in which user device data is mapped into groups. The data in the fields 314 (FIG. 5) of data locations 312 are sorted into the groups 362. Each group 362 corresponds to a tag. Groups 362 may be generated from any available information. For example, group 362-1 may include groups of identification numbers. Group 362-2 may include location data of each user device 6 as received from the device. Group 362-3 may comprise demographic information gathered from the user devices 6. In order to address selected segments of an audience, data from a selected group 362 is mapped into an address list. This selection may be made by the VJ 70 via the central server 8. Displays may be provided to the user devices 6 so that an individual group 362 receives an input unique to that group. Additionally, different groups may be provided with different information or displays in order to produce a composite display for all or part of a venue 10. Groups 362 may also consist of individual users 4.

Criteria for establishing a group 362 may include remote client, gender, age, location within venue, device type, e.g., iOS or Android, device family, e.g., iPhone, 4G, or iPad, and random selection. In addition, the framework allows for the creation, collection, and persistence of arbitrary metrics for use as segregation criteria. Individual devices can be added or removed from any grouping as desired. Groups are independent and can overlap. Once defined, the grouping can be used as targets for specific commands.

Addressing groups may be accomplished by the VJ 70. Alternatively, a program may be created to select groups. Generally speaking, the groups and communications to and from the groups are controlled by the server 300.

Figure 7:
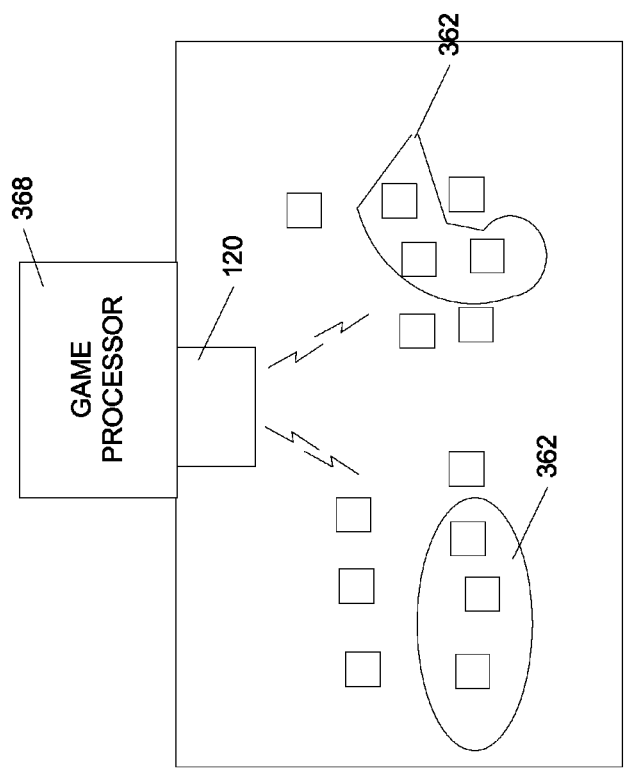
FIG. 7 is a block diagram illustrating implementation of a game through device addressing of user devices.

FIG. 7 is a block diagram illustrating implementation of a game accomplished by device addressing of user devices 6. By addressing messages to individual devices, lotteries can be conducted and winners and losers can be informed of individual outcomes. A scavenger hunt game may be arranged in which a plurality of groups of users 4 are created so that one group of users 4 may compete against another. A game processor 368 coupled to receive communications passing through the Wi-Fi hotspot 120 may process data in accordance with rules defining a game. Required communications between user devices 6 are controlled by use of each user device's unique identification number, A "scavenger hunt" may be implemented by providing codes associated with a subset of users 4 which another subset of users 4 requires to complete a game or puzzle. The second set of users 4 has to "ping" other users to access the required code.

The utilization of the unique identification of each user device 6 is used to allow the central server 8 to select the user devices 6 that will receive commands. The central server 8 may command messaging between individuals in the audience either one-on-one, one-to-many, or many-to-one. In this example, "many" comprises a group 362.

Figure 8:
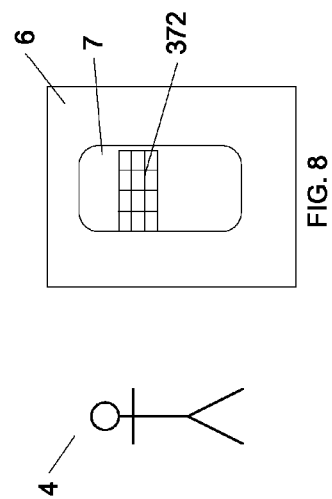
FIG. 8 is a block diagram illustrating support of messaging between individuals in the audience.

FIG. 8 is a block diagram illustrating support of messaging between individuals in the audience. In this alternative embodiment, users 4 are allowed to initiate contact with other audience members. A particular user 4 may communicate with the app 7 by a graphical user interface (GUI) 372 on the portable user device 6. The user 4 may operate the GUI 372 to select a particular audience member or to select an entire category or request the server 300 to produce a new group 362 in accordance with the wishes of the user 4.

In order to assign selected user devices 6 to a group, a device family segregation method is employed. Client devices are segregated into groupings based on a selected metric.

Simplified access to selected users 4 is provided. Additionally, users 4 can be enabled to request specific data. The sorting function supports the creation of arbitrary data elements for later reference by name. Data elements may include groupings, commands, or demographic data. This can be used to send a specific complex or often used command or to define a grouping of devices.

The previous description is provided to enable any person skilled in the art to make or use the present invention. Various modifications to these aspects will be readily apparent to those skilled in the art, and the generic principles defined herein may be applied to other aspects without departing from the spirit or scope of the invention. For example, one or more elements can be rearranged and/or combined, or additional elements may be added. A wide range of systems may be provided consistent with the principles and novel features disclosed herein.

The invention claimed is:

1. A system for providing a shared interactive audience enhanced experience using portable interactive devices of audience members in a venue at an event comprising:
    a concert controller providing content to the audience and for receiving communications from the audience, the content being provided in addition to the event;
    a media system coupled to said concert controller, said media system providing content to the concert controller for provision to the audience, the media system being operated by a video jockey, the media system coupled to coordinate content from the concert controller with the event;
    a content recognition system coupled to review content uploaded from the audience and coupled for control by the video jockey to select content to send to devices in the audience;
    a Wi-Fi network, said Wi-Fi network comprising a plurality of transceivers positioned according to a venue survey for providing substantially complete coverage of the venue; a node in said Wi-Fi network coupled to communicate with said concert network controller;
    a backhaul infrastructure in said Wi-Fi network coupling said transceivers to said node; and said Wi-Fi network being coupled to provide content from a central server and for coupling content uploaded by users to said central server.

2. The system according to claim 1 wherein the video jockey comprises at least one person.

3. The system according to claim 1 wherein said central server is programmed to assign a unique identification number to each portable interactive device, the number being coupled to the concert controller for enabling the concert controller to select to be sent to the respective user device.

4. The system according to claim 3 wherein said central server includes a register to assign a unique identification number to each portable interactive device in correspondence with an order in which a device logs on as a member of the audience.

5. The system according to claim 4 wherein said media system is coupled for allowing assignment by the video jockey of content to be provided to groups of portable interactive devices in accordance with the unique identification number.

6. The system according to claim 5 wherein said media system is coupled for allowing creation by the video jockey of a plurality of groups and enabling interaction between groups.

7. A method for providing a shared interactive audience enhanced experience using portable interactive devices of audience members in a venue at an event comprising:
    providing content to the audience from a concert controller and receiving communications from the audience at the concert controller, the content being provided in addition to the event;
    selecting content from a media system, and providing the content to the audience via the concert controller, operating the media system to coordinate content provided from the concert controller with the event;
    recognizing content uploaded from the audience and reviewing the uploaded content operating the media system to select content to send to devices in the audience;
    communicating content to the audience via a Wi-Fi network comprising a plurality of transceivers positioned according to a venue survey for providing substantially complete coverage of the venue;
    coupling the Wi-Fi network to said concert controller via a node; and
    coupling said transceivers to said node via a backhaul infrastructure.

8. The method according to claim 7 further comprising assigning a unique identification number to each portable interactive device and providing the unique identification number for use with the media system coupled to said concert controller.

9. The method according to claim 8 further comprising creating groups of selected unique identification numbers.

10. The method according to claim 9 further comprising providing content to selected groups.

* * * * *